June 20, 1967 W. D. TINSLEY 3,326,417
AUTOMATIC LIQUID DISPENSING MACHINE
Filed July 5, 1962 2 Sheets-Sheet 1

INVENTOR.
William D. Tinsley
BY
ATTORNEY

June 20, 1967 W. D. TINSLEY 3,326,417
AUTOMATIC LIQUID DISPENSING MACHINE
Filed July 5, 1962 2 Sheets-Sheet 2
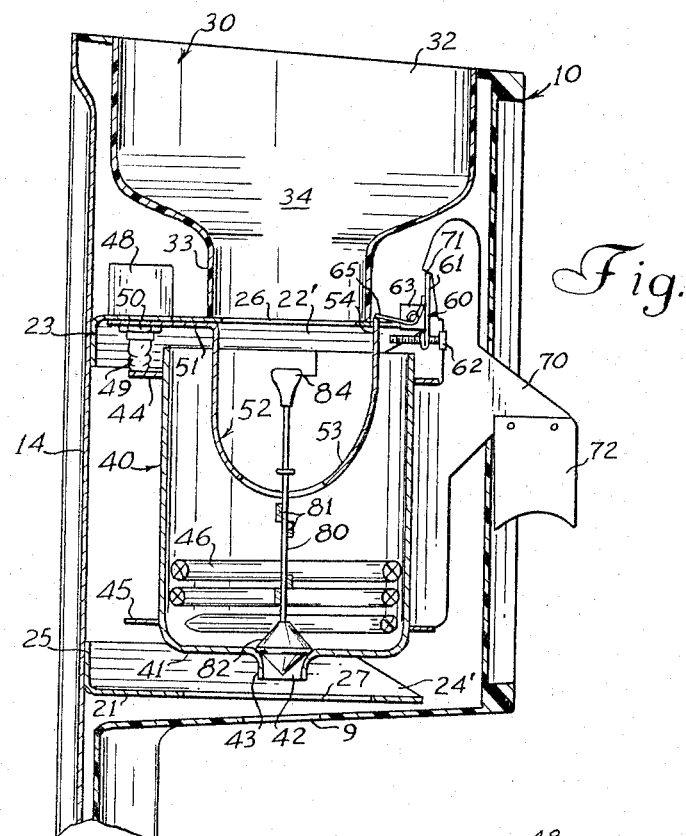
Fig. 3
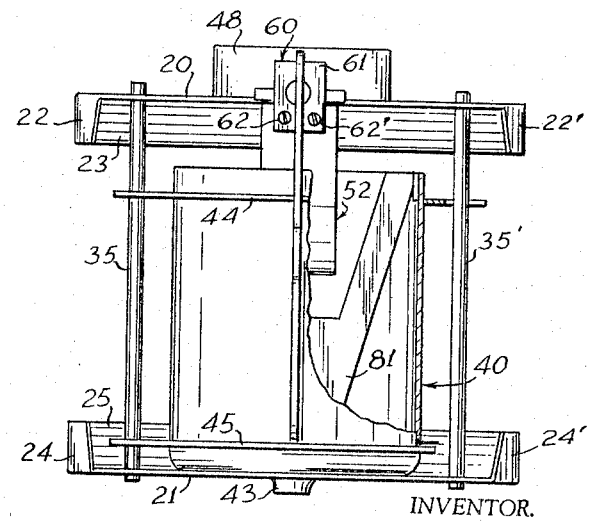
Fig. 4
INVENTOR.
BY William D. Tinsley
ATTORNEY United States Patent Office 3,326,417
Patented June 20, 1967

3,326,417
AUTOMATIC LIQUID DISPENSING MACHINE
William D. Tinsley, Marietta, Ga., assignor to Techomatic Industries, Inc., Atlanta, Ga., a corporation of Georgia
Filed July 5, 1962, Ser. No. 207,633
14 Claims. (Cl. 222—54)

This invention relates to an automatic liquid dispensing machine and is more particularly concerned with a machine which will successively heat and dispense automatically a predetermined amount of liquid.

In the past, liquid dispensing machines have been devised for dispensing a measured amount of a heated liquid. Such devices have usually included a reservoir wherein the liquid is heated to and maintained at a given temperature, and a valving arrangement wherein the valve is held open for a prescribed amount of time so that only a portion of the heated liquid is dispensed upon each cycle of the machine.

Such prior art machines have usually been bulky and expensive, requiring large heating elements to heat and maintain the liquid in the reservoir at the prescribed temperature. They have also involved electrical timing devices which determine the length of time the valve is held open. Obviously, it is a slow process to heat a large volume of liquid and it is expensive to maintain this large volume of liquid at an elevated temperature, simply to provide successive measured small amounts of the liquid when required.

The present invention is a relatively inexpensive device which obviates the difficulties described above by pre-measuring the amount of liquid to be heated, then heating only the measured amount of liquid and automatically dispensing the same only after it has been heated to a prescribed temperature. In general terms, the liquid dispensing machine of the present invention includes a relatively small heating cup or container within which is disposed a heating coil. The heating container is movable in a vertical path from a normal dispensing position to a raised filling and heating position.

Above the heating container is a liquid reservoir in the form of an inverted bottle which has a valved fluid passageway adapted to discharge liquid into the container. A valve member within the container has a double function of closing the discharge opening of the container and also opens a fluid passageway each time the container is raised to its filling and heating position, whereby liquid from the reservoir is discharged into the heating container to a predetermined level as a temperature responsive detent assembly holds the container in its raised position. When the container is raised, a switch is closed by the container to energize the heating coil. Thus, the liquid received by the container is heated until the temperature responsive detent assembly is actuated to release the container which moves downwardly, closing the valved fluid passageway and opening the discharge valve to discharge the liquid from the container.

Accordingly, it is an object of the present invention to provide a liquid dispensing machine which will measure a predetermined amount of liquid, heat this measured amount of liquid and then automatically dispense the liquid in a heated condition.

Another object of the present invention is to provide a device having the characteristics described above which will accomplish the measuring, heating and dispensing of the liquid in a short period of time.

Another object of the present invention is to provide a liquid dispensing machine for measuring, heating and dispensing liquid, which machine is inexpensive to manufacture, durable in structure and efficient in operation, having few moving parts and well adapted to the demands of mass production.

Another object of the present invention is to provide a liquid dispensing machine which successively heats and dispenses measured amounts of liquid, wherein the prescribed temperature to which the liquid is to be heated may be readily and easily adjusted.

Another object of the present invention is to provide a liquid dispensing machine which is peculiarly adapted to heat a cup of water for the subsequent production of an "instant" coffee drink or soup drink.

Other objects, features and advantages of the present invention will become apparent from the following description when taken in conjunction with the accompanying drawings wherein like characters of reference designate corresponding parts throughout the several views and wherein:

FIG. 3 is an enlarged vertical sectional view taken along essentially the center line of the machine shown in FIG. 1, the cup thereof being in the raised position.

FIG. 4 is a fragmentary view of a detail showing many of the working parts illustrated in FIG. 3, the parts being rotated 90° with respect to FIG. 3 and the cup thereof being in its normal dispensing position.

Figure 1:
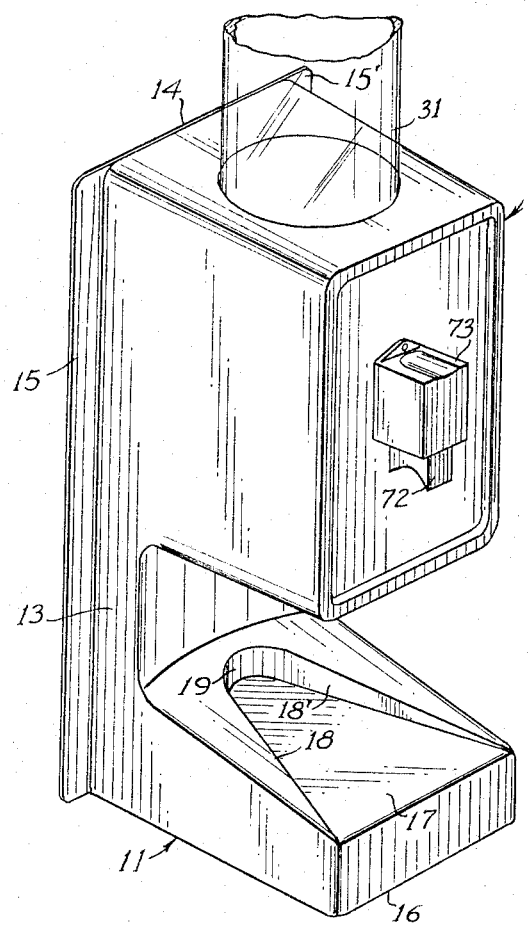
FIG. 1 is a perspective view of an automatic dispensing machine constructed in accordance with the present invention.

Referring now in detail to the embodiment chosen for the purpose of illustrating the present invention, it being understood that in its broader aspects the present invention is not limited to the exact details herein depicted, the dispenser includes a casing having a dispenser housing 10 positioned above a cup receiving block or platform 11. The housing 10 and block 11 are held in vertically spaced alignment by a connecting waist 13 along the back portion of the casing, whereby the housing 10 overhangs the block 11.

The back 14 extends the entire height of the dispenser and is provided with outwardly extending side flanges 15, 15' by means of which the dispenser may be mounted on a wall.

The block 11 includes a flat bottom 16 perpendicular to back 14, by means of which the dispenser may be received on a flat horizontal surface. The upper portion of the block 11 is inclined upwardly and rearwardly and is recessed along its central and forward portion to provide a cup receiving surface 17 and opposed cup guiding shoulders 18, 18'. The shoulders 18, 18' converge rearwardly, their inner ends being joined by a concaved shoulder 19. The function of shoulders 18, 18' and 19 is to guide a cup (not shown) into a position below a discharge opening 9 in housing 10 for receiving the liquid which is to be dispensed from the dispensing mechanism within the overhanging housing 10.

Figure 2:
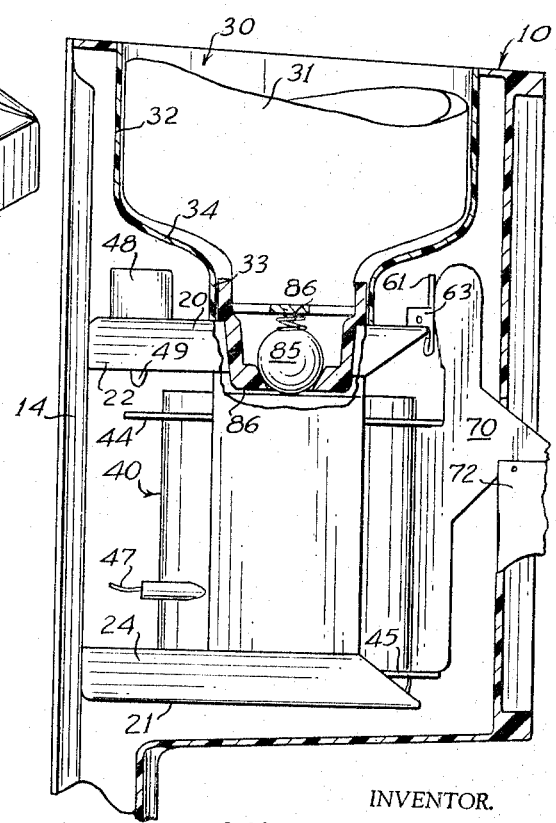
FIG. 2 is an enlarged fragmentary side elevational view of a portion of the machine shown in FIG. 1, the side cover being removed to reveal the interior thereof.

Within the housing 10, as seen in FIGS. 2, 3 and 4, is the dispensing mechanism which includes a pair of vertically spaced, parallel supporting plates 20 and 21. The top or upper plate 20 is a stamped member having downwardly turned side flanges 22, 22' and a downwardly turned back flange 23, the flange 23 being secured to back 14 so that the plate 20 extends essentially horizontally forward. Likewise, the bottom or lower plate 21 includes side flanges 24, 24', and a back flange 25 by which the plate 21 is secured to back 14. The plates 20 and 21 are provided with aligned holes or apertures 26 and 27 respectively.

Above the upper plate 20 is a bottle receiving and retaining member, denoted generally by numeral 30. The function of the retaining member 30 is to receive and support in an inverted position a bottle or jug 31, seen in FIG. 1. For this purpose, the member is shaped to conform to the upper portion, neck and mouth of the bottle 31. Thus, the member 30 has an upper ring 32 and a lower ring 33 concentric therewith. A frustro-conical intermediate portion 34 joins the two rings 32 and 33 together. The lower edge of ring 33 is secured to plate 20 and surrounds the aperture 26 while the upper end of ring 32 is secured to the top of housing 10. The neck of bottle 31 protrudes through aperture 26.

Extending between the plates 20 and 21 are a pair of guide rods 35, 35′, between which is disposed the heating vat, container or cup 40 within which the water is heated. Cup 40 is a cylindrical member open at the top and provided with a bottom 41 having a discharge opening 42 in its central portion, the opening 42 forming a valve seat surrounded by a short, downwardly extending spout 43 which is aligned with opening 9.

A pair of spaced radially disposed, parallel annular guide fins 44 and 45 surround the cup 40 and are provided with appropriate holes through which the guide pins 35, 35′ extend.

It will be understood that the height of cup 40 is less than the distance between plates 20 and 21 to permit vertical movement of cup 40 from its normal discharge position, shown in FIG. 4, to a raised filling and heating position shown in FIG. 3. In the filling and heating position, the upper edge or rim of cup 40 is above the mouth 86 of bottle 31.

Disposed within the cup 40 is a coil 46 of electrical resistance metal which forms an electrical heating element connected by flexible wires 47 to a source of current through a push button switch 48 mounted on plate 20.

The plunger 49 of switch 48 protrudes through a hole in plate 20 so that its end may be engaged and depressed by fin 44, as seen in FIG. 3. Therefore, whenever the cup 40 is in its raised position, plunger 49 is depressed to close switch 48 and energize the coil 46. The switch 48 and its plunger 49 are held in place by a nut 50, seen in FIG. 3.

Between the plate 20 and nut 50 is the base plate 51 of a flat, rectangular, bimetallic, leaf type, temperature responsive member or thermostat, denoted generally by numeral 52. The base 51 extends outwardly over the rim of cup 40 and then is bent downwardly to provide a U-shaped sensing member 53 which is adapted to dip below the normal liquid level in cup 40, when cup 40 is in its raised position. The outer end portion 54 of member 52 is essentially upright and protrudes through a slot in plate 20 to terminate slightly above the surface of plate 20.

Outwardly of the end portion 54, there is a detent member denoted generally by numeral 60. The function of the detent member 60 is to support cup 40 and pivot, when engaged by the member 52, to release the cup 40 for downward movement. In more detail, the detent member 60 includes a flat rectangular upright sear 61, the lower end of which is reversely bent to receive therethrough a pair of set screws 62, 62′, the set screws 62, 62′ extending horizontally inwardly to terminate adjacent the side of end portion 54 of thermostat 52.

A pair of spaced ears, such as ear 63, protrudes inwardly from the central portion of the upstanding sear 61 and are received on a horizontally disposed shaft 64 carried by plate 20. A spring 65 coiled around shaft 64 has one end acting against the upper portion of sear 61 and the other end riding at all times on the end of portion 54 of member 52. For cooperating with sear 61, there is an upstanding latch plate 70 which is secured to the side of cup 40 between fins 44 and 45. The upper end of latch plate 70 protrudes above the sear 61 and is cut out along its inner surface to provide a sear engaging shoulder 71 alignable with the upper edge of sear 61 when the cup 40 is raised.

It will be understood that when the sear 61 engages shoulder 71 and is pivoted in a counterclockwise direction, as viewed in FIG. 3, the upper edge of sear 61 will be moved from beneath shoulder 71, thereby releasing the latch plate 70 to move downwardly by gravity with cup 40.

The forward portion of latch plate 70 protrudes through a slot in the front of housing 11 and is provided with a downwardly extending cocking or operating arm 72, outside of housing 11, by means of which the cup 40 is moved from its normal position to its raised position. The protruding portion of latch plate 70 and the upper portion of cocking arm 72 are enclosed in a downwardly opening cover 73 which prevents the operating arm 72 from being lifted beyond the cocking position of sear 61.

The valve means, whereby the opening 42 is closed when the cup 40 is raised for receiving and heating the water and whereby water is admitted to the cup 40, includes a valve stem 80 carried in an upright position axially within cup 40. The valve stem 80 is slideably mounted by a plurality of arms 81 which protrude radially inwardly from the inner surface of cup 40. Thus, stem 80 is free to move axially upwardly and downwardly. The lower end of valve stem 80 is provided with a valve 82 having a conically shaped lower surface adapted to seat in the valve seat provided by opening 42.

The upper portion of valve stem 80 protrudes through a hole in the lowermost portion of the sensing member 53 of the thermostat 52 and is provided, thereabove, with an arresting or stopped disc 83 fixed thereon and adapted to engage the sensing member 53 to limit the downward movement of stem 80, when cup 40 moves downwardly, to thereby permit the cup 40 to move beyond valve 82 so that valve 82 is unseated.

At the upper end of valve stem 80 is the means for admitting a measured amount of water into cup 40. This includes a ball engaging knob 84, the function of which is to open the discharge passageway from bottle 31 by engaging and unseating a ball check valve 85 in the mouth 86 of bottle 31. It will be understood that the ball check valve 85 is normally urged outwardly to a seated position by a spring 86 within the neck of bottle 31.

*Operation*

From the foregoing description, the operation of the present device should be apparent. First the bottle 31 is inverted and placed in the bottle receiving and retaining member 30 whereby the mouth 86 of the bottle 31 protrudes below the plate 20 and its ball check valve 85 is poised above the ball engaging knob 84 in spaced relationship thereto. In this position, none of the water, or other liquid, in the inverted bottle 31 is discharged because, at this stage, the ball check valve 85 remains closed.

When it is desired to heat and discharge a measured amount of water, or other liquid, from the dispenser, arm 72 is lifted the full extent of its travel which, via latch plate 70, lifts cup 40 from its normal position resting upon plate 21, as seen in FIG. 4, to a raised position shown in FIG. 3. When cup 40 is raised its full extent, the detent 60 is thereby actuated to hold the cup 40 in its raised position. In other words, shoulder 71 on latch plate 70 is aligned with the top of sear 61 and spring 65 urges the sear 61 in a clockwise direction to latch under shoulder 71 and provide support therefor.

When the cup 40 begins its upward travel, the opening 42 is moved toward valve 82, whereby the valve 82 seats thereagainst to close the cup 40 against discharge. With further upward movement of cup 40, the cup 40 lifts the valve 82 therewith, thereby lifting stem 80 upwardly, until, as the cup 40 approaches its uppermost position, the knob 84 engages the ball check valve 85. Still further movement upwardly of cup 40, valve 82, valve stem 80 and knob 84 causes knob 84 to push the ball check valve 85 inwardly (upwardly), thereby releasing the water or other liquid in bottle 31.

The water from bottle 31 then flows into cup 40 until the water level reaches the level of the mouth 86 of bottle 31, at which time the water ceases to flow, having delivered a measured amount of water to cup 40, is determined by the position of mouth 86 with respect to cup 40.

As the cup 40 approaches its uppermost position, the plunger 49 of switch 48 is depressed, by fin 44, thereby closing switch 48 to energize coil 46 which heats the water within cup 40. The water level of the water within cup 40 is above the sensing member 53 of temperature responsive member 52 and thus, as the water is heated, the temperature responsive member 52 is also heated, causing its end portion 54 to move progressively outwardly until it strikes and urges outwardly the ends of set screws 62, 62'.

The outward urging of set screws 62, 62' pivots the detent member 60 in a counterclockwise direction until sear 61 is moved from beneath shoulder 71, releasing the latch member 70 to move downwardly by gravity. The cup 40 is therefore permitted to return to its normal position.

Upon downward movement of cup 40, the knob 84 moves downwardly therewith and, therefore, is retracted from ball check valve 86, permitting the ball check valve 86 to closed. Also, the fin 44 is retracted from plunger 49, thereby permitting the switch 48 to open. Thereafter, the stop disc 83 engages the sensing member 53 to arrest the downward movement of the valve stem 80 whereby the further downward movement of cup 40, in again coming to rest on plate 21, moves the opening 42 away from valve 82 whereby the water in cup 40 is discharged through opening 9 in the bottom of housing 10, into a cup (not shown) or other receptacle positioned therebelow on the block 11.

If it is desired to reset the predetermined temperature at which the detent 60 is actuated, the set screws 62, 62' need only be manipulated to move their ends closer or further away from the end portion 54 of member 52.

It will be understood that while a bottle 31 has been used for the purpose of illustrating a liquid reservoir, other reservoirs having other forms of check valves may be employed and that other parts may be changed and modified without departing from the inventive concept disclosed herein; therefore, it will be obvious to those skilled in the art that many variations may be made in the single embodiment here chosen for the purpose of illustrating the present invention without departing from the scope thereof as defined by the appended claims.

I claim:

1. In a liquid heating and dispensing machine, a cup movable in a vertical path from a lower discharge position to a filling and heating position thereabove, said cup having a discharge opening in its bottom through which liquid may be discharged, a liquid reservoir having a discharge passageway for introducing liquid into said cup, a heating element associated with said cup for heating liquid within said cup, a detent for latching said cup in said heating or filling position, a thermostat actuated by the temperature of liquid within said cup for actuating said detent to release said cup when said liquid has reached a prescribed temperature, and valve means actuated by movement of said cup for closing said discharge opening upon upward movement of said cup and for opening said discharge opening upon downward movement of said cup, said valve means being also operative for opening said discharge passageway from said reservoir for supplying a measured amount of liquid from said reservoir to said cup when said cup is moved upwardly.

2. In a liquid heating and dispensing machine, a cup movable in a vertical path from a lower discharge position to a filling and heating position thereabove, said cup having a discharge opening in its bottom through which liquid may be discharged, a liquid reservoir having a discharge passageway for introducing liquid into said cup, a heating element associated with said cup for heating liquid within said cup, a switch carried by said housing and actuatable upon movement of said cup toward said heating and filling position, a detent for latching said cup in said heating or filling position, means connecting said heating element to a source of current via said switch for actuation when said switch is actuated, a thermostat actuated by the temperature of liquid within said cup for actuating said detent to release said cup when said liquid has reached a prescribed temperature, and valve means actuated by movement of said cup for closing said discharge opening upon upward movement of said cup and for opening said discharge opening upon downward movement of said cup, said valve means being also operative for opening said discharge passageway from said reservoir for supplying a measured amount of liquid from said reservoir to said cup when said cup is moved upwardly.

3. A liquid heating and dispensing machine comprising a casing having a base, a waist portion above said base, a housing extending from said waist portion over said base, and a dispensing mechanism within said housing, said dispensing mechanism being characterized by a cup movable in a vertical path from a lower discharge position to a filling and heating position thereabove, said cup having a discharge opening in its bottom through which liquid may be discharged, a liquid reservoir having a discharge passageway for introducing liquid into said cup, a heating element associated with said cup for heating liquid within said cup, a switch carried by said housing and actuatable upon movement of said cup toward said heating and filling position, a detent for latching said cup in said heating or filling position, means connecting said heating element to a source of current via said switch for actuation when said switch is actuated, a thermostat actuated by the temperature of liquid within said cup for actuating said detent to release said cup when said liquid has reached a prescribed temperature, and valve means actuated by movement of said cup for closing said discharge opening upon upward movement of said cup and for opening said discharge opening upon downward movement of said cup, said valve means being also operative for opening said discharge passageway from said reservoir for supplying a measured amount of liquid from said reservoir to said cup when said cup is moved upwardly.

4. A liquid heating and dispensing machine comprising a casing having a base, a waist portion above said base, a housing extending from said waist portion over said base, and a dispensing mechanism within said housing, said dispensing mechanism being characterized by a cup movable in a vertical path from a lower discharge position to a filling and heating position thereabove, said cup having a discharge opening in its bottom through which liquid may be discharged, an inverted bottle supported over said cup and having a mouth below the level of the rim of said cup when said cup is in its raised position for introducing liquid into said cup, a check valve in said bottle, a heating element within said cup for heating liquid within said cup, a switch carried by said housing and actuatable upon movement of said cup toward said heating and filling position, a detent for latching said cup in said heating or filling position, means connecting said heating element to a source of current via said switch for actuation when said switch is actuated, a thermostat actuated by the temperature of liquid within said cup for actuating said detent to release said cup when said liquid has reached a prescribed temperature, and valve means actuated by movement of said cup for closing said discharge opening upon upward movement of said cup and for opening said discharge opening upon downward movement of said cup, said valve means being also operative for opening said check valve for supplying a measured amount of liquid from said reservoir to said cup when said cup is moved upwardly.

5. In a device of the class described, a housing, a bottle carried in an inverted portion by said housing, a check valve in the mouth of said bottle which opens upon being moved inward thereof, a cup within said housing below said bottle, said cup being movable in a vertical path toward and away from said bottle, the mouth of said bottle protruding into said cup when said cup is in its raised position, for feeding liquid into said cup to a prescribed level defined by said mouth of said bottle when said check valve is opened, valve means for opening said check valve when said cup is raised, valve means in said cup for discharging said cup when said cup is in a lowered position, means for actuating said cup and a detent within said housing for releasably holding said cup in its raised position and means for actuating said detent to release said cup.

6. The structure defined in claim 5 including an operating arm extending from said cup through a slot in said housing.

7. The structure defined in claim 6 including a cover mounted on said housing and having an opening in one side thereof for receiving within said cover said operating arm when said cup is in its raised position.

8. The structure defined in claim 7 wherein said means for releasably holding said cup includes a temperature responsive means extending into said cup and responsive to the temperature of liquid within said cup, and a heating element actuated when said cup is in its raised position for heating said liquid.

9. The structure defined in claim 8 wherein said temperature responsive means is a U-shaped metallic member disposed below said mouth of said bottle, and wherein said detent includes a pivotable plate carried by said casing and one end of said temperature responsive member is adapted to pivot said plate when at predetermined temperature of said liquid.

10. The structure defined in claim 9 wherein said operating arm includes a shoulder engageable with one edge of said plate when said cup is in its raised position.

11. In a device of the class described, a housing, a bottle removably carried in an inverted position by said housing, a check valve for said bottle which opens upon being moved inwardly thereof, first means within said housing below said bottle for receiving the discharge of liquid from said bottle, the mouth of said bottle protruding within the upper portion of said first means for discharging liquid by gravity into said first means to a prescribed level defined by said mouth of said bottle, valve means in said first means for discharging liquid from said cup when said valve means is opened, control means for opening said check valve and closing said valve means in one position of said control means and for opening said valve means and closing said check valve in another position of said control means, heating means for heating liquid within said first means, means for energizing said heating means when said control means is in said one position and for deenergizing said heating means when said control means is in its other position, detent means for maintaining said control means in said one position and thermostatic means for releasing said detent means to release said control means from said one position when the liquid in said first means has reached a prescribed temperature.

12. In a device of the class described, a housing, a bottle removably carried in an inverted position by said housing, a check valve in the mouth of said bottle which opens upon being moved inwardly thereof, first means within said housing below said bottle for receiving the discharge of liquid from said bottle, the mouth of said bottle protruding within the upper portion of said first means for discharging liquid by gravity into said first means to a prescribed level defined by said mouth of said bottle, valve means in said first means for discharging liquid from said first means when said valve means is opened, a valve stem within said first means and extending upwardly toward said check valve for opening said check valve as said valve means is closed in one position of said valve stem and for permitting said check valve to close as said valve means is opened in another position of said valve stem, heating means for heating liquid within said first means, means for energizing said heating means when said valve stem is in said one position and for deenergizing said heating means when said valve stem is in its other position, detent means for maintaining said valve stem in said one position and thermostatic means for releasing said detent means to release said valve stem from said one position when the liquid in said first means has reached a prescribed temperature.

13. A fluid dispenser comprising a reservoir container having a mouth opening adapted to contain a supply of fluid; a receiving container adapted to receive a predetermined amount of said fluid from said supply; said containers being movable relative to one another between operative and inoperative positions; a normally closed valve means for valving said opening to control the flow of fluid from said reservoir, means for actuating said valve means in the operative position of said container for permitting the flow of a measured amount of fluid from said reservoir container to said receiving container, said containers being disposed relative to one another in the operative position thereof so that the liquid level in the receiving container seals the opening to prohibit flow in excess of predetermined amount.

14. A liquid dispensing and heating device comprising a stand, a reservoir container containing a supply of liquid supported on said stand, said reservoir container having a normally closed valved opening through which the liquid is discharged therefrom, a receiving container disposed for receiving a predetermined amount of liquid from said reservoir container, means for moving one of said containers relative to the other between operative and inoperative positions, valve actuating means disposed between said container for actuating the valve opening of said reservoir container in the operative position of said containers, means for latching said containers in the operative position thereof, a heater for heating the liquid in said reservoir container, switch means connected in circuit with said heater, said switch means being actuated to energize said heater in the operative position of said containers and to deenergize said heater in the inoperative position of said containers, and means for automatically releasing said latch means for repositioning said containers in inoperative position when the liquid has been heated to a predetermined temperature.

References Cited
UNITED STATES PATENTS

| | | | |
|---|---|---|---|
| 1,836,893 | 12/1931 | Austin | 222—217 X |
| 2,135,168 | 11/1938 | Cannon | 141—360 X |
| 2,415,861 | 2/1947 | Bauerlein et al. | 222—355 X |
| 2,522,898 | 9/1950 | Sanborn | 222—354 X |
| 2,568,474 | 9/1951 | Van Sciver | 222—54 |
| 2,784,885 | 3/1957 | Kneisley et al. | 141—360 X |
| 2,831,671 | 4/1958 | Leonard | 99—305 X |
| 2,841,177 | 7/1958 | Schmidt | 222—361 X |
| 2,883,921 | 4/1959 | Morrison | 222—54 X |
| 2,912,143 | 11/1959 | Woolfolk | 222—506 X |
| 2,926,234 | 2/1960 | Palmer | 99—305 |
| 3,061,152 | 10/1962 | Safianoff et al. | 141—360 X |
| 3,109,558 | 11/1963 | Yetter | 222—162 X |
| 3,243,271 | 3/1966 | Garcia | 222—54 X |

RAPHAEL M. LUPO, *Primary Examiner.*

LOUIS J. DEMBO, *Examiner.*

R. YOST, A. T. McKEON, *Assistant Examiners.*